United States Patent [19]
Park

[11] Patent Number: 5,675,101
[45] Date of Patent: Oct. 7, 1997

[54] PLAYBACK SYSTEM FOR REPRODUCING VIDEO SONG MEDIA HAVING CHORD DATA RECORDED THEREON

[75] Inventor: Chan-Sou Park, Seoul, Rep. of Korea

[73] Assignee: Daewoo Electronics Co., Ltd., Seoul, Rep. of Korea

[21] Appl. No.: 496,524

[22] Filed: Jun. 29, 1995

[30] Foreign Application Priority Data

Jun. 29, 1994 [KR] Rep. of Korea ............. 94-15143

[51] Int. Cl.$^6$ ............. G09B 15/04; G10H 1/38
[52] U.S. Cl. ............. 84/637; 84/477 R; 84/DIG. 22
[58] Field of Search ............. 84/601, 602, 609–614, 84/634–638, 477 R, 478, 464 R, 464 A, DIG. 6, DIG. 22

[56] References Cited

U.S. PATENT DOCUMENTS

| | | | |
|---|---|---|---|
| 4,995,026 | 2/1991 | Makabe et al. | 84/464 R X |
| 5,336,844 | 8/1994 | Yamauchi et al. | 84/610 X |
| 5,506,370 | 4/1996 | Nakai et al. | 84/637 |

*Primary Examiner*—Stanley J. Witkowski
*Attorney, Agent, or Firm*—Fish & Richardson, P.C.

[57] ABSTRACT

Video-song media having chord data recorded thereon and playback system thereof for reproducing the chord responsive to a singer's singing voice are disclosed. The video-song media having chord data recorded thereon has the chord data which is additionally recorded in a sub-code of the program area having video-song information therein. The playback system for the video-song media having chord data recorded thereon, reproduces word data to the song, the accompaniment music and the graphic signal relating to a corresponding music, and also reproduces the chord specified by chord data in response to the voice input signal provided by a voice input device. Accordingly, sound effects can be maximized in order to multiply the user's interest while practicing singing the video-song.

7 Claims, 7 Drawing Sheets

FIG.4

| FUNCTIONS | R S T U V W |
|---|---|
| MEMORY RESET | 0 0 0 0 0 1 |
| DIRECTING THE SAME STATE AS PREVIOUS DATA | 0 0 0 0 1 0 |
| KEY ADJUSTMENT | 0 0 0 0 1 1 |
| CHORD CONTROL DATA | 0 0 0 1 0 0 |
| RESERVATION | 0 0 0 1 0 1 <br> . <br> . <br> . <br> . <br> . <br> . <br> . <br> 1 1 1 1 1 1 |

FIG.5

| R S T U V W | DIFFERENCE SIGNALS BETWEEN VOICE INPUT SIGNALS AND CHORDS THEREOF (CCD) |
|---|---|
| 0 0 1 1 0 0 | +12 |
| 0 0 1 0 1 1 | +11 |
| 0 0 1 0 1 0 | +10 |
| 0 0 1 0 0 1 | +9 |
| 0 0 1 0 0 0 | +8 |
| 0 0 0 1 1 1 | +7 |
| 0 0 0 1 1 0 | +6 |
| 0 0 0 1 0 1 | +5 |
| 0 0 0 1 0 0 | +4 |
| 0 0 0 0 1 1 | +3 |
| 0 0 0 0 1 0 | +2 |
| 0 0 0 0 0 1 | +1 |
| 0 0 0 0 0 0 | 0 |
| 1 0 0 0 0 0 | −1 |
| 1 0 0 0 0 1 | −2 |
| 1 0 0 0 1 0 | −3 |
| 1 0 0 0 1 1 | −4 |
| 1 0 0 1 0 0 | −5 |
| 1 0 0 1 0 1 | −6 |
| 1 0 0 1 1 0 | −7 |
| 1 0 0 1 1 1 | −8 |
| 1 0 1 0 0 0 | −9 |
| 1 0 1 0 0 1 | −10 |
| 1 0 1 0 1 0 | −11 |
| 1 0 1 0 1 1 | −12 |

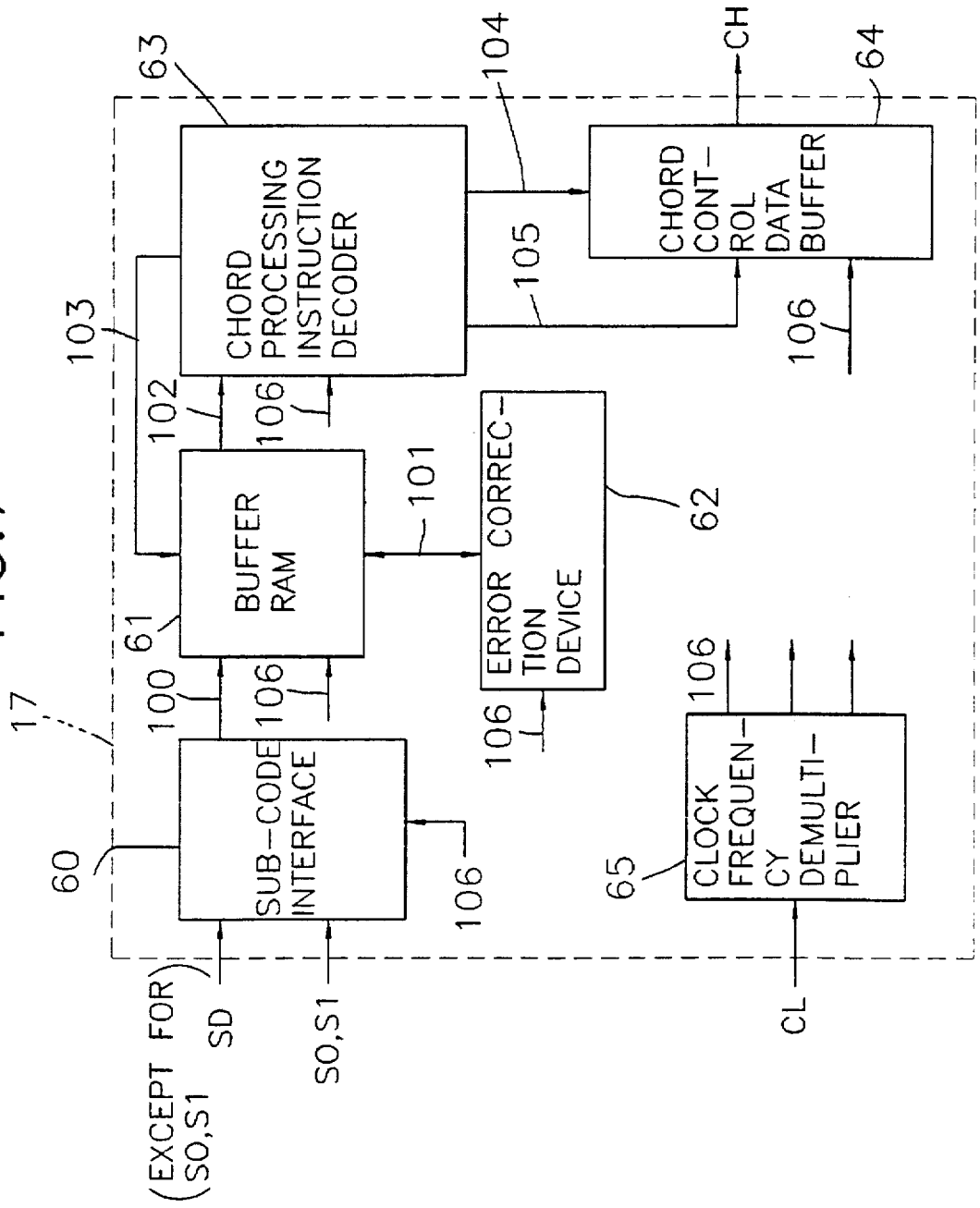

PLAYBACK SYSTEM FOR REPRODUCING VIDEO SONG MEDIA HAVING CHORD DATA RECORDED THEREON

BACKGROUND OF THE INVENTION

1. Field of the Invention

The present invention relates to a musical accompaniment playing apparatus called "KARAOKE" equipment. More particularly, the present invention relates to an audio/video information recording medium and a playback system thereof for generating the chord in response to a singer's song inputted through a voice input device such as a microphone.

2. Description of the Prior Art

At present, musical accompaniment playing apparatuses are widespread, in which one or more singers practice singing a song, looking at the words to the song displayed on the screen of a display equipment while being accompanied by a pre-recorded music. These musical accompaniment playing apparatuses include CDG(Compact Disc Graphics) discs having word data to songs, accompaniment musics and graphic information recorded thereon, or disc type audio/video information recording media on which information, e.g., word data to songs, accompaniment musics and moving video signals, can be massively recorded. Hereinafter, the recording media such as CDG discs disc type audio/video information recording media, and playback systems thereof are respectively designated as "video-song media" and "video-song playback systems". Each of video-song playback systems includes audio/video playback equipment in which a video-song medium is loaded and information, e.g., word data to songs, accompaniment music and moving video signals, are reproduced from the loaded video-song medium. The audio/video playback equipment is operatively coupled to control equipment and display equipment. The audio/video playback equipment may comprise stand alone equipment or may be integrated into the control equipment. An audio amplifier is operatively coupled to the control equipment.

In the aforementioned video-song playback system, when a singer's singing voice is inputted into a voice input device such as a microphone in response to words data to the song and the accompaniment music which are reproduced from a CDG disc or a laser disc, the inputted singing voice is converted into an electrical signal. The electrical signal, via an amplifier, is amplified, and filtered through a low pass filter, and then passes through a speaker in order to be outputted therefrom. Also, each of the video-song playback systems functions to adjust a musical interval of accompaniment music of a selected video-song in order to double singer's interest while practicing a video-song. Furthermore, in the video-song playback systems, a pair of signal level detectors is synchronized with each other while functioning to respectively detect signal levels of a singer's singing voice and an accompaniment music with a predetermined time interval, and a microprocessor sums up computed signal level differences between two signals until the singer's singing of a song is finished, and then a score display device displays a score of a singing of the singer.

As an example of the aforementioned video-song playback systems, U.S. Pat. No. 5,296,643 (granted to Jen-Wei Kuo and Tat N. Ho) discloses the configuration of automatic musical key adjustment system for karaoke equipment.

FIG. 1 is a block diagram for showing a control unit constituting an automatic musical key adjustment system for karaoke equipment disclosed in U.S. Pat. No. 5,296,643. As shown in FIG. 1, control unit 23 comprises a vertical blanking interval data decoder 53, a data decompressor 54, a song profile interpreter 52, a digital signal processor 56, processing circuitry 55, a vocal range display panel 30, and a special effects event sequencer and drivers 57.

The composite video signal is coupled from the video output of audio/video device (not shown) to vertical blanking interval data decoder 53 and to the video input of a display device (not shown), via lead. Vertical blanking interval data decoder 53 functions to decode the encoded data generated during the vertical fly-back interval of the video signal. The composite video signal, which includes the encoded song profile and/or stage effect data is operatively coupled from the audio/video playback device to the input of vertical blanking interval data decoder 53. The song profile and stage effect data is operatively coupled to data decompressor 54. Data decompressor 54 decompresses the stage effect data and converts the stage effect data into usable form, which is then coupled to song profile interpreter 52.

Data demodulator 50 demodulates or extracts the song profile data, e.g., key, tempo, style, etc., from the composite audio signal and couples the demodulated data to the song profile data and converts the song profile data into usable form , which is then coupled to song profile interpreter 52.

Song profile interpreter/CPU 52 in response to an analysis of the vocal ability of the karaoke singer and a comparison with the profile data of the pre-recorded music/song composition, provides control signals to audio processing circuitry 55. Song profile interpreter/CPU 52, in response to decoded stage effect signals, provides light, and/or motion signals, via driver circuits 57 to control the lighting and scenery effects during the karaoke singer's performance.

In the aforementioned automatic musical key adjustment system for karaoke equipment, since the musical key of the pre-recorded accompaniment music may be altered automatically to substantially coincide with the analyzed or given vocal range of the karaoke singer, e.g., soprano, tenor, mezzo-soprano, baritone, alto and bass, or with the preferred key to be sung entered by the karaoke singer, the karaoke singer doesn't need to suffer from the trial-and-error manual key adjustments while singing.

However, all these prior art video-song playback systems just amplify singer's singing voice inputted to the voice input device, or output key-adjusted accompaniment music in response to singer's singing voice along with the amplified singing voice. As a result, the audible output of the singing voice signal becomes monotonous, and with regard to the video-song which requires the chord thereof, the real mood or essence of the song can not be provided.

SUMMARY OF THE INVENTION

Therefore, it is a first object of the present invention to provide a video-song medium having chord data recorded thereon which are recorded in a sub-code of the program area having video-songs recorded thereon and match a singer's singing voice or an accompaniment music for the video-song.

It is a second object of the present invention to provide a playback system for a video-song medium having chord data recorded thereon, in which the user's interest in practicing singing the video-song, can be doubled while causing sound effects to be maximized with the chord generated in response to the voice input signal, i.e., the singer's singing voice inputted through a voice input device.

In order to achieve the above first object, the present invention provides a video-song medium having chord data recorded thereon, which comprises:

a video-song medium having chord data recorded thereon, comprising:

a first channel located in a program area, the first channel relating to musical information;

a plurality of second channels relating to graphic information, the second channels being located in the program area and having graphic data recorded therein relating to the musical information; and a chord data relating to the musical information and recorded in the plurality of second channels relating to the graphic information, whereby the first channel and a plurality of second channels constitute a sub-code, and the chord data are recorded in a plurality of second channels relating to the graphic information recorded therein so as to reproduce the chord in response to a singer's singing voice.

Preferably, the chord data have a format including a plurality of synchronous signals and 12 packs, each of the packs which has 8 symbols as the composition unit thereof. Also, the pack includes a user mode having a mode and an item, two identical instructions, two identical data for adjusting a musical interval of the chord, and parity bits for error detection and correction. The instruction includes a memory reset instruction, an instruction for directing the same state as previous data, an instruction for key adjustment, chord control data, and instructions for users' reservations.

In order to achieve the second object, the present invention provides a playback system for reproducing a video-song medium having chord data recorded thereon, which comprises:

an audio/video readout means for reading out an accompaniment music signal, word data to a song, and a chord data signal from video-song media on which the word data to the song, the accompaniment music signal, and graphic information are respectively recorded in a program area and chord control data is additionally recorded in a plurality of channels relating to graphic information in a sub-code, and outputting a readout audio signal;

a digital signal processing section means for extracting and processing an accompaniment music signal and a chord data signal in response to the readout audio signal provided by the audio/video readout means, and outputting an accompaniment music signal and a chord data signal which has synchronous signals and chord control data;

an accompaniment music processing means for reproducing an audible accompaniment music signal in response to the accompaniment music signal provided by the digital signal processing section means, and outputting a first buffer signal;

a voice input signal processing means for processing a voice input signal corresponding to a singer's singing voice provided by a voice input device, and outputting a second buffer signal;

a chord generation means for producing a chord signal in response to the chord data and the second buffer signal respectively provided by the digital signal processing section means and the voice input signal processing means, and outputting a chord processing circuitry signal;

an output pre-processing means for multiplexing and processing the second buffer signal and the chord processing circuitry signal respectively provided by the voice input signal processing means and chord generation means in order to be suitable for data outputting, and outputting an audio amplifier signal; and an audio output means for converting into audible signals the audio amplifier signal and the first buffer signal respectively provided by the output pre-processing means and the accompaniment music processing means. Preferably, the digital signal processing section means is responsive to chord data including a plurality of synchronous signals, a user mode, a memory reset instruction, an instruction for directing the same state as previous data, an instruction for key adjustment and chord control data, data for adjusting a musical interval with respect to chord generation, and parity bits.

Further, the accompaniment music processing means preferably includes a data conversion section for converting into an analog signal the digital signal processing signal provided by the digital signal processing section means, and outputting a data conversion section signal; a first low-pass filter for low-pass filtering the data conversion section signal provided by the data conversion section in order to increase the signal-to-noise ratio of the data conversion section signal, and outputting a first low filter signal; and a first buffer for buffering the first low filter signal, and outputting a first buffer signal to the audio output section means.

Further, the voice input signal processing means preferably includes a second low-pass filter for low-pass filtering the voice input signal provided by the voice input device in order to increase the signal-to-noise ratio of the voice input signal, and outputting a second low-pass filter signal; and a second buffer for buffering the second low-pass filter signal, and outputting a second buffer signal to the chord generation means and the output pre-processing means.

Further, the chord generation means preferably includes a chord data decoder for decoding the chord control data signal provided by the digital signal processing means while being synchronized with the synchronous signals provided by the digital signal processing means, and outputting a chord data decoder signal; a chord processing circuitry for generating a chord from the inputted chord data decoder signal and second buffer signal respectively provided by the chord data decoder and the the second buffer constituting the voice input signal processing means, and outputting a chord processing circuitry signal; and a clock generation section for providing a clock signal to the chord data decoder and the chord processing circuitry so that the chord data decoder may decode the chord control data signal and the chord processing circuitry may produce the chord according to a reference timing.

Further, the output pre-processing means preferably includes a switching section for switching at a high speed the second buffer signal and the chord processing circuitry signal respectively provided by the second buffer constituting the voice input signal processing means and the chord processing circuitry constituting the chord generation means, and outputting a switching section signal; a third low-pass filter for low-pass filtering the switching section signal provided by the switching section in order to increase the signal-to-noise ratio of the switching section signal, and outputting a third low filter signal; and an audio amplifier for amplifying the third low filter signal provided by the third low-pass filter in order to increase the signal level of the third low filter signal, and outputting an audio amplifier signal to the audio output section means.

Further, the chord data decoder preferably includes a sub-code interface for converting sub-code data which is serial data and provided by digital signal processing section, into a sub-code interface signal which is a parallel signal in order to output a sub-code interface signal; a buffer ram for buffering the sub-code interface signal and for outputting a buffer ram signal; an error correction device for correcting an error of the sub-code interface signal to generate the buffer ram signal, the error correction device being coupled to the buffer ram; a chord processing instruction decoder for deriving and processing an instruction and data from chord data, and outputting in response to the buffer ram signal provided by buffer ram, a first chord processing instruction decoder signal and a second chord processing instruction decoder signal respectively corresponding to the data and the instruction of the chord data and outputting a third chord processing instruction decoder signal to buffer ram; a chord control data buffer for latching the first chord processing instruction decoder signal corresponding to data latch signal in order to function to adjust a musical interval with regard to chord reproduction while being subject to control operation with inputted second chord processing instruction decoder signal thereto, and outputting a chord data decoder signal to chord processing circuitry; and a clock frequency demultiplier for frequency-demultiplying the clock signal provided by clock generation section in order to apply a frequency-demultiplied clock frequency demultiplier signal to the sub-code interface, the buffer ram, the error correction device, the chord processing instruction decoder, and the chord control data buffer.

In a video-song medium having chord data recorded thereon and a playback system thereof according to the present invention, chord data concerning musical information are recorded in the sub-code of the video-song medium, and chord signals according to chord data are generated in response to the voice input signals inputted through the voice input device. As a result, user's interest in practicing singing the video-song is multiplied and the user can realize the real mood or essence of video-song requiring the chord, such that the chord is automatically generated in response to singer's singing voice while practicing singing the video-song.

BRIEF DESCRIPTION OF THE DRAWINGS

The above objects and other advantages of the present invention will become more apparent by describing in detail the preferred embodiment of the present invention with reference to the attached drawings, in which:

FIG. 4 is a table for showing the format of an instruction which constitutes the chord data shown in FIG. 3;

FIG. 5 is a table for showing the format of chord control data which constitutes the instruction shown in FIG. 4;

FIG. 7 is a more detailed block diagram for showing the configuration of a chord data decoder which constitutes the control equipment shown in FIG. 6.

DESCRIPTION OF THE PREFERRED EMBODIMENT

A description will be given below in detail to the structure and operation of a video-song medium having chord data recorded thereon and a playback system thereof according to an embodiment of the present invention with reference to the accompanying drawings.

Figure 1:
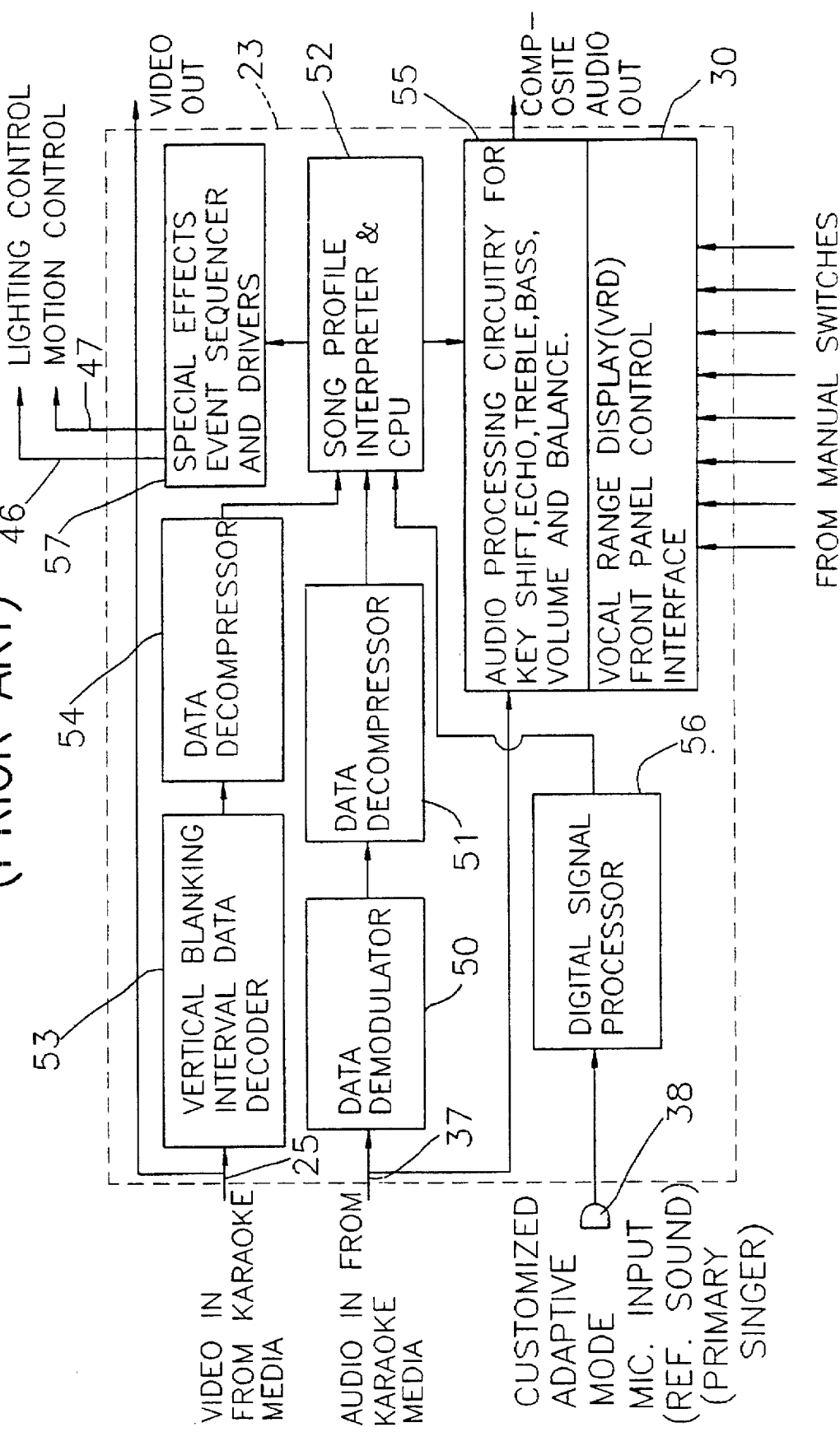
FIG. 1 is a block diagram for showing the configuration of a control unit which constitutes an automatic musical key adjustment system for karaoke equipment disclosed in U.S. Pat. No. 5,296,643.
Figure 2:
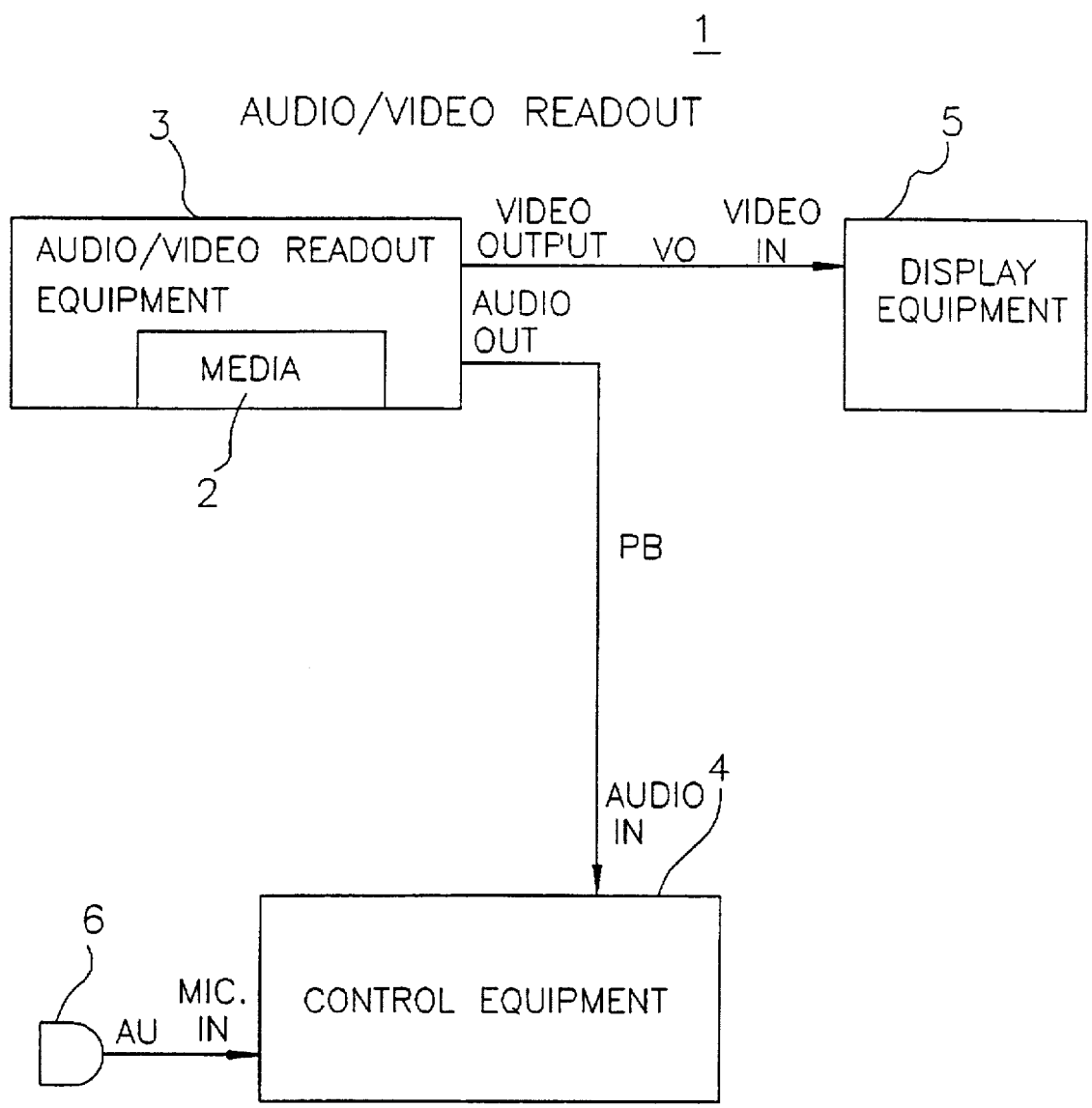
FIG. 2 is a block diagram for showing the configuration of a playback system for a video-song medium having chord data recorded thereon according to one embodiment of the present invention.

FIG. 2 is a block diagram for showing the configuration of a playback system for a video-song medium having chord data recorded thereon according to one embodiment of the present invention. As shown in FIG. 2, the playback system for the video-song medium having chord data recorded thereon 1 includes audio/video readout equipment 3. The video-song medium having chord data recorded thereon is loaded on a turntable of audio/video readout equipment 3. Therefore, audio/video readout equipment 3 reads out signals for the word data to the songs, the accompaniment music and the graphic information. The video-song medium has chord data which are recorded in a sub-code of the program area having video-songs recorded therein and match a singer's singing voice or accompaniment music for the video-song. Audio/video readout equipment 3 is operatively coupled to control equipment 4 and display equipment 5 such as a television set. Display equipment 5 may be a standard commercially available television having an input jack (not shown). The words to the song are displayed on the screen of display equipment 5 to aid the singer. A highlighter or pointer may be displayed to indicate each of the words or phrases which should be vocalized to be in tempo or synchronism with the accompaniment music. The video output of audio/video readout equipment 3 is coupled to the video input of display equipment 5. Audio/video readout equipment 3 provides a video signal VO to display equipment 5. The output of audio/video readout equipment 3 is coupled to the audio input of control equipment 4. Audio/video readout equipment 3 provides a readout audio signal to control equipment 4. A voice input device 6 such as a microphone, is coupled to the voice input port of control equipment 4. Voice input device 6 provides to control equipment 4 a voice input signal AU which is an electrical signal coverted from a singer's singing voice. Audio/video readout equipment 3 may comprise a stand alone equipment or may be integrated into control equipment 4.

A disc type video-song medium having chord data recorded thereon according to an preferred embodiment of the present invention, includes a TOC(Table Of Contents) area in which control information of video-song medium is recorded, the program area in which information of video-songs are recorded, and a readout area for indicating the end of the video-song program. A format of a signal of a video-song in the sub-code which is recorded in the program area, includes an R channel-W channel in which a still video signal is recorded, a Q channel which indicates whether a video-song signal is emphatically processed or not and has information recorded therein such as index amid a song, song number (track number), the time elapsed during singing a song(a relative time), the time elapsed from the program starting point (an absolute time), and a P channel for indicating an interval between a song and the other song.

The sub-code is defined as including a first channel which is located in the program area and relates to (is defined for recording musical data relating to) musical information, and a plurality of second channels which is located in the program area and relates to (is defined for recording graphic data relating to) a graphic information. Graphic data relating to the musical information are recorded in a plurality of second channels relating to the graphic information in the sub-code. Chord data relating to a corresponding musical information, are additionally recorded in a plurality of second channels relating to the graphic information in the sub-code.

Figure 3:
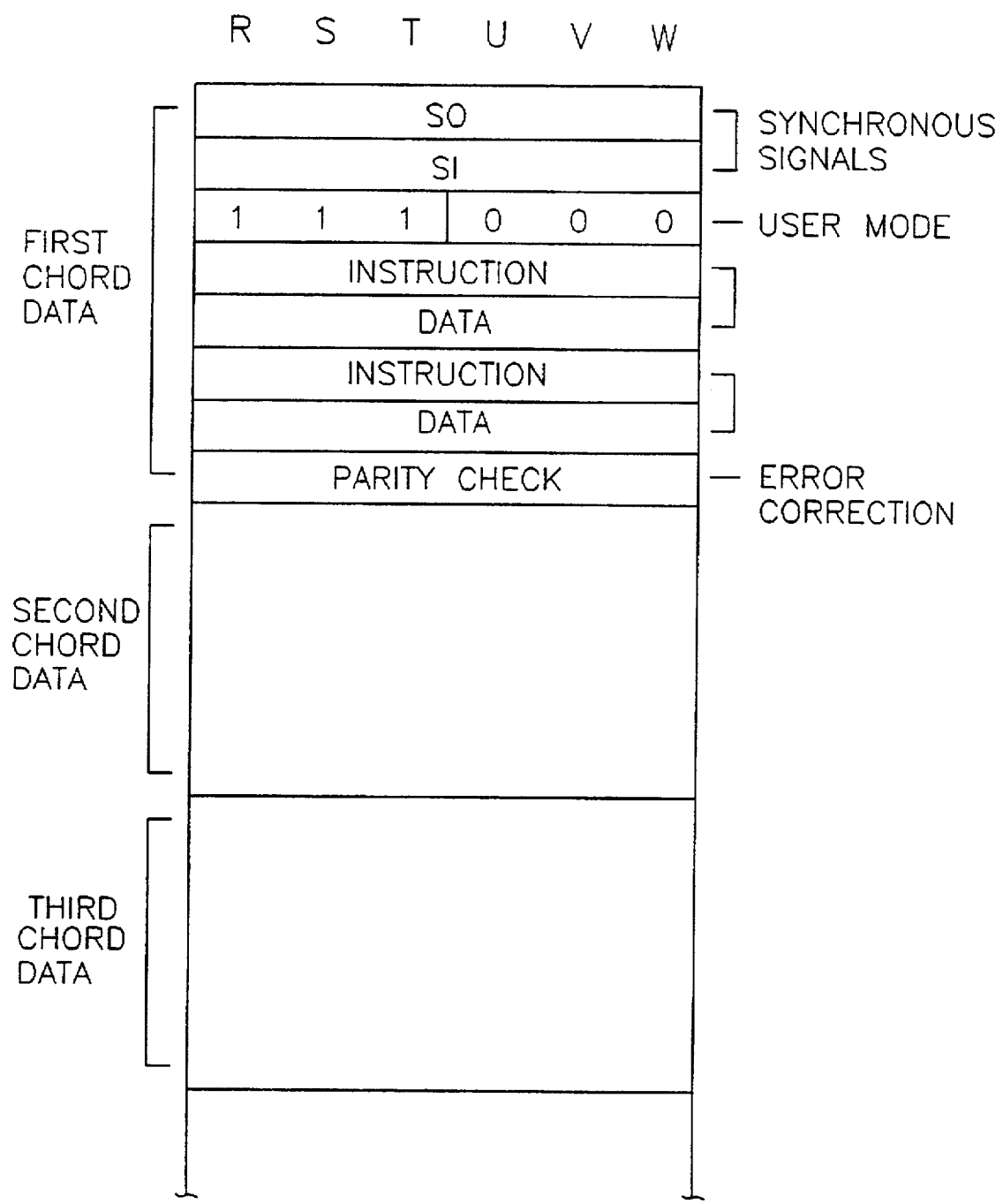
FIG. 3 is a diagrammatic view for showing the format of chord data which are recorded in a sub-code of a video-song medium as shown in FIG. 2, having chord data recorded thereon.

FIG. 3 is a diagrammatic view for showing a format of chord data which are recorded in a sub-code of a video-song medium as shown in FIG. 2, having chord data recorded thereon. As shown in FIG. 3, a basic format of the R channel-W channel which is one of the channels included in the sub-code, comprises sub-code synchronism patterns S0 and S1, i.e., synchronous signals, and the 96 symbols constituting a packet. The one packet comprising 96 symbols is divided into packs comprising 8 symbols. Therefore, each of the packets includes 12 packs each of which has 8 symbols as the composition unit. Each of the packs includes recording parts for a user mode consisting of a mode and an item, instructions, data fields, and a parity check for error detection and correction.(see FIG. 3) In the user mode, the mode is specified as the user mode, e.g., "1 1 1", while recording chord data, and the item is specified as "0 0 0", and the instructions and data are respectively recorded twice, and the parity data are recorded for error detection and correction.

FIG. 4 is a table for showing the format of an instruction which constitutes the chord data shown in FIG. 3. As shown in FIG. 4, each of the instructions according to the present invention, includes a memory reset instruction, an instruction for directing the same state as a previous data, an instruction for key adjustment, chord control data, and instructions for user's reservations.

As a result, the chord control data are specified to be recorded in the R channel-W channel which has a pack as the composition unit therein in the sub-code of video-song medium 2. FIG. 5 is a table for showing the format of chord control data which constitutes the instruction shown in FIG. 4. As shown in FIG. 5, the formats of the chord control data are defined. The chord control data are recorded in the packs of the R channel-W channel which corresponds to the singer's singing voice or the accompaniment music which require the chord data read out from the the video-song medium 2. Then, since the chord control data recorded in the sub-code are reproductively processed at the speed of 12 pack×72 Hz per second, it is possible to provide the requisite chord control data at an appropriate reproducing timing of the singer's singing voice or the accompaniment music.

Figure 6:
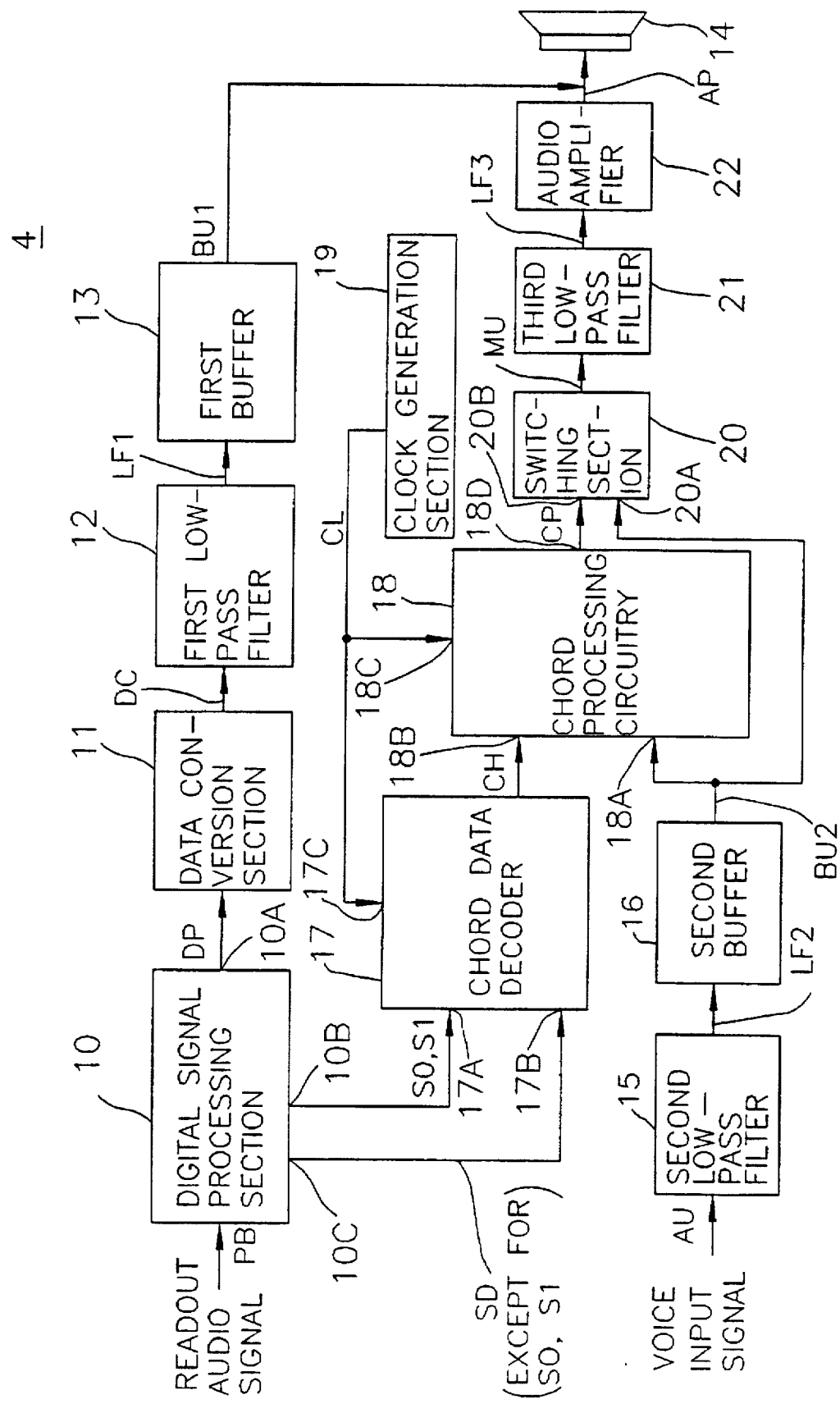
FIG. 6 is a block diagram for showing the configuration of control equipment as shown in FIG. 2, which constitutes the playback system for the video-song medium having chord data recorded thereon.

FIG. 6 is a block diagram for showing the configuration of a control equipment as shown in FIG. 2, which constitutes the playback system for the video-song medium having chord data recorded thereon. As shown in FIG. 6, control equipment 4 (see FIG. 2) comprises a digital signal processing section 10, a data conversion section 11, a first low-pass filter 12, a first buffer 13, a second low-pass filter 15, a second buffer 16, a chord data decoder 17, a chord processing circuitry 18, a clock generation section 19, a switching section 20, a third low-pass filter 21, an audio amplifier 22, and an audio output section 14.

The output of audio/video readout equipment 3 is coupled to the input of digital signal processing section 10 so that audio/video readout equipment 3 may output a readout audio signal PB to digital signal processing section 10.

Digital signal processing section 10 extracts and processes all accompaniment music signal and a chord data signal in response to readout audio signal PB provided by audio/video readout equipment 3. A first output 10A of digital signal processing section 10 is coupled to the input of data conversion section 11.

Data conversion section 11 outputs data conversion section signal DC, i.e., an analog signal, in response to accompaniment music audio signal DP which is a digital signal and provided by digital signal processing section 10. The output of data conversion section 11 is coupled to the input of first low-pass filter 12. Therefore, data conversion section 11 is embodied by a digital/analog converter.

First low-pass filter 12 outputs a first low filter signal LF1 having an increased signal-to-noise ratio, in response to analog data conversion section signal DC provided by data conversion section 11. The output of first low-pass filter 12 is coupled to the input of first buffer 13.

First buffer 13 outputs a first buffer signal BU1 which is buffered, in response to first low filter signal LF1 provided by first low-pas filter 12. The output of first buffer 13 is coupled to the input of audio output section 14.

Audio output section 14 outputs audible accompaniment music in response to first buffer signal BU1 provided by first buffer 13. Therefore, audio output section 14 is embodied by a speaker.

The output of voice input device 6 such as a microphone is coupled to the input of second low-pass filter 15 so that voice input device 6 outputs a voice input signal AU to second low pass filter 15.

Second low pass filter 15 outputs a second low filter signal LF2 having an increased signal-to-noise ratio, in response to voice input signal AU provided by voice input device 6. The output of second low pass filter 15 is coupled to the input of second buffer 16.

Second buffer 16 outputs a second buffer signal BU2 which is buffered, in response to second low filter signal LF2 provided by second low pass filter 15. The output of second buffer 16 is coupled to a first input 18A of chord processing circuitry 18 and a first input 20A of switching section 20.

A second output 10B and a third output 10C of digital signal processing section 10 is respectively coupled to a first input 17A and a second input 17B of chord data decoder 17 so that digital signal processing section 10 may provide to chord data decoder 17 synchronous signals S0 and S1, and a sub-code data SD which includes a chord control data CCD.(see FIG. 5) The output of clock generation section 19 is coupled to a third input 17C of chord data decoder 17 so that clock generation section 19 may provide clock signal CL to chord data decoder 17.

Chord data decoder 17 outputs a chord data decoder signal CH in response to sub-code data SD which includes synchronous signals S0 and S1, and chord control data CCD and provided by digital signal processing section 10. The output of chord data decoder 17 is coupled to a second input 18B of chord processing circuitry 18. The output of clock generation section 19 is coupled to a third input 18C of chord processing circuitry 18 so that clock generation section 19 may provide clock signal CL to chord processing circuitry 18.

FIG. 7 is a more detailed block diagram for showing the configuration of a chord data decoder which constitutes the control equipment shown in FIG. 6. As shown in FIG. 7, chord data decoder 17 includes a sub-code interface 60, a buffer ram 61, an error correction device 62, a chord processing instruction decoder 63, a chord control data buffer 64, and a clock frequency demultiplier 65.

Digital signal processor 10 outputs to sub-code interface 60 sub-code data SD which is serial data and includes synchronous signals S0 and S1, and chord control data CCD. Clock generation section 19 outputs clock signal CL to clock frequency demultiplier 65.

Sub-code interface 60 converts an inputted serial signal into a parallel signal, and outputs to buffer ram 61 a sub-code interface signal 100 which is a parallel signal, in response to sub-code data SD which is serial data.

Buffer ram 61 is coupled to error correction device 62, end functions to buffer sub-code interface signal 100 in order to output a buffer ram signal 102 to chord processing instruction decoder 63.

Error correction device 62 reads the buffered sub-code interface signal 100 from buffer ram 61 in order to function to correct an error thereof, and outputs error correction device signal 101 to buffer ram 61.

Chord processing instruction decoder 63 derives and processes an instruction and data from inputted chord data, and outputs to chord control data buffer 64 a first choral processing instruction decoder signal 104 and a second chord processing processing decoder signal 105, respectively corresponding to the data and the instruction, and outputs to buffer ram 61 a third chord processing instruction decoder signal 103.

Chord control data buffer 64 latches first chord processing instruction decoder signal 104 corresponding to data latch signal while being subject to control operation with inputted second chord processing instruction decoder signal 105 thereto, in order to function to adjust the musical interval with regard to the chord reproduction, and outputs a chord data decoder signal CH to chord processing circuitry 18.

Meanwhile, clock frequency demultiplier 65 frequency-demultiplies clock signal CL provided by clock generation section 19 in order to apply a frequency-demultiplied clock frequency demultiplier signal 106 to sub-code interface 60, buffer ram 61, error correction device 62, chord processing instruction decoder 63, and chord control data buffer 64. Therefore, the operation within chord data decoder 17 is carried out according to the timing of clock signal CL.

Chord processing circuitry 18 outputs a chord processing circuitry signal CP in response to chord data decoder signal CH and second buffer signal BU2 respectively provided by chord data decoder 17 and second buffer 16. A first output 18D of chord processing circuitry 18 is coupled to a second input 20B of switching section 20. Chord processing circuitry 18 has a conventional circuit configuration.

Switching section 20 outputs a switching section signal MU which is multiplexed, in response to chord processing circuitry signal CP and second buffer signal BU2 respectively provided by chord processing circuitry 18 and second buffer 16. The output of switching section 20 is coupled to the input of third low-pass filter 21. Therefore, switching section 20 is embodied by a multiplexer.

Third low-pass filter 21 outputs a third low filter signal LF3 having an increased signal-to-noise ratio in response to switching section signal MU provided by switching section 20. The output of third low-pass filter 21 is coupled to the input of audio amplifier 22.

Audio amplifier 22 outputs an audio amplifier signal AP having an increased signal level in response to third low filter signal LF3 provided by third low-pass filter 21. The output of audio amplifier 22 is coupled to the input of audio output section 14.

Audio amplifier signal AP provided by audio amplifier 22, includes the singer's singing voice signal and the chord signal, and is inputted to audio section 14.

Hereinafter, the processes that the accompaniment music signal, the singer's singing voice signal and the chord data signal are respectively reproduced and outputted from video-song medium having chord data recorded thereon 2 and playback system thereof 1 according to the present invention, will be described in the aforementioned order.

Readout audio signal PB provided by audio/video readout equipment 3, is inputted to digital signal processing section 10. Digital signal processing section 10 extracts and processes accompaniment music signal DP and chord data signals S0, S1 and CCD. Accompaniment music signal DP is inputted to data conversion section 11. Data conversion section 11 converts accompaniment music signal DP, i.e., a digital signal, into data conversion section signal DC, i.e., an analog signal, which is then inputted to first low-pass filter 12. First low-pass filter 12 low-pass filters the inputted conversion signal DC in order to increase the signal-to-noise ratio of the inputted data conversion signal DC, and outputs first low filter signal LF1 to first buffer 13. First buffer 13 buffers the inputted first low filter signal LF1 and outputs first buffer signal BU1 to audio output section 14. In this manner, audio output section 14 produces an improved and enhanced output of the accompaniment music of the video-song selected by the singer.

While the selected accompaniment music of the video-song is reproduced from playback system 1 for video-song medium having chord data recorded thereon 2 as in one of the above processes, the singer applies the singer's singing voice to voice input device 6, and audio input signal AU is outputted from voice input device 6. Audio input signal AU is inputted to second low-pass filter 15. Second low-pass filter 15 low-pass filters the inputted audio input signal AU in order to increase the signal-to-noise ratio of the inputted audio input signal AU, and outputs second low filter signal LF2 to second buffer 16. Second buffer 16 buffers an inputted second low filter signal LF2 and outputs second buffer signal BU2 to chord processing circuitry 18 and switching section 20.

Then, chord control data signal CCD and synchronous signals S0 and S1 provided by digital signal processing section 10, are inputted to chord data decoder 17. Chord data decoder 17 is synchronized by synchronous signals S0 and S1, and decodes the inputted chord control data CCD in order to output chord data decoder signal CH to chord processing circuitry 18. Synchronous signals S0 and S1 are recorded in the sub-code reproduced from video-song medium having chord data thereon 2, and chord control data CCD are recorded in the sub-code data, i.e., the R channel-W channel. Chord processing circuitry 18 produces chord processing circuitry signal CP from the inputted chord data decoder signal CH and second buffer signal BU2 provided by second buffer 16, and outputs chord processing circuitry signal CP to switching section 20. Meantime, clock signal CL provided by clock generation section 19, is applied to chord data decoder 17 and chord processing circuitry 18. While synchronized with timing of clock signal CL, chord data decoder 17 decodes chord control data CCD, and chord processing circuitry 18 produces chord processing circuitry signal CP.

As shown in FIG. 5, when the accompaniment music is reproduced from video-song medium having chord data recorded thereon 2, in case "sol" is the chord which matches voice input signal AU, e.g., "mi", outputted from voice input device 6, the chord control data 000011 which corresponds to the difference between the "mi" sound and the "sol" sound and is recorded in instruction part of video-song medium having chord data recorded thereon 2, is read out from instruction part in order to be inputted to chord data decoder 17. Chord data decoder signal CH provided by chord data decoder 17, is inputted to chord processing circuitry 18, and the processing of the chord control data decoding is effected in order to reproduce the chord "sol".

As in the aforementioned processes, second buffer signal BU2 and chord processing circuitry signal CP respectively provided by second buffer 16 and chord processing circuitry 18, are inputted to switching section 20 in order to be outputted at a high speed switching, i.e., multiplexing. Switching section signal MU provided by switching section 20, is inputted to third low-pass filter 21. Third low-pass filter 21 low-pass filters the inputted switching section signal MU in order to increase the signal-to noise ratio of the inputted switching section signal MU, and outputs third low filter signal LF3 to audio amplifier 22. Audio amplifier 22 optimally amplifies the inputted third low filter signal LF3 in order to output audio amplifier signal AP to audio output section 14. Audio output section 14 outputs the singer's song, and the chord which matches the singer's song and the accompaniment music in response to audio amplifier signal AP provided by audio amplifier 22.

In video-song medium having chord data recorded thereon 2 and playback system thereof 2 according to the present invention, the accompaniment music is recorded on the video-song medium along with the chord data in order to reproduce the chord data matching a musical interval of the singer's singing voice. As a result, sound effects can be maximized while practicing singing the video-song. Accordingly, the user's interest in practicing singing the video-song can be multiplied. Further, the user can realize the real mood or essence of the video-song requiring the chord.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A playback system for a video-song medium having chord data recorded thereon, comprising:

an audio/video readout means for reading out an accompaniment music signal, word data to a song, and a chord data signal from video-song medium on which the word data to the song, the accompaniment music signal, and graphic information are respectively recorded in a program area and chord control data is additionally recorded in a plurality of channels relating to graphic information in a sub-code, and outputting a readout audio signal;

a digital signal processing section means for extracting and processing an accompaniment music signal and a chord data signal in response to the readout audio signal provided by the audio/video readout means, and outputting an accompaniment music signal and a chord data signal which has synchronous signals and chord control data;

an accompaniment music processing means for reproducing an audible accompaniment music signal in response to the accompaniment music signal provided by the digital signal processing section means, and outputting a first buffer signal;

a voice input signal processing means for processing a voice input signal corresponding to a singer's singing voice provided by a voice input device, and outputting a second buffer signal;

a chord generation means for producing a chord signal in response to the chord data and the second buffer signal respectively provided by the digital signal processing section means and the voice input signal processing means, and outputting a chord processing circuitry signal;

an output pre-processing means for multiplexing and processing the second buffer signal and the chord processing circuitry signal respectively provided by the voice input signal processing means and chord generation means in order to be suitable for data outputting, and outputting an audio amplifier signal; and an audio output means for converting into audible signals the audio amplifier signal and the first buffer signal respectively provided by the output pre-processing means and the accompaniment music processing means.

2. A playback system for a video-song medium having chord data recorded thereon as claimed in claim 1, wherein the digital signal processing section means is responsive to chord data including a plurality of synchronous signals, a user mode, a memory reset instruction, an instruction for directing the same state as previous data, an instruction for key adjustment and chord control data, data for adjusting a musical interval with respect to chord generation, and parity bits.

3. A playback system for a video-song medium having chord data recorded thereon as claimed in claim 1, wherein the accompaniment music processing means includes:

a data conversion section for converting into an analog signal the digital signal processing signal provided by the digital signal processing section means, and outputting a data conversion section signal;

a first low-pass filter for low-pass filtering the data conversion section signal provided by the data conversion section in order to increase the signal-to-noise ratio of the data conversion section signal, and outputting a first low filter signal; and a first buffer for buffering the first low filter signal, and outputting a first buffer signal to the audio output section means.

4. A playback system for a video-song medium having chord data recorded thereon as claimed in claim 1, wherein the voice input signal processing means includes:

a second low-pass filter for low-pass filtering the voice input signal provided by the voice input device in order to increase the signal-to-noise ratio of the voice input signal, and outputting a second low-pass filter signal; and a second buffer for buffering the second low-pass filter signal, and outputting a second buffer signal to the chord generation means and the output pre-processing means.

5. A playback system for a video-song medium having chord dada recorded thereon as claimed in claim 1, wherein the chord generation means includes:

a chord data decoder for decoding the chord control data signal provided by the digital signal processing means while being synchronized with the synchronous signals provided by the digital signal processing means, and outputting a chord data decoder signal;

a chord processing circuitry for generating a chord from the inputted chord data decoder signal and second buffer signal respectively provided by the chord data decoder and the second buffer constituting the voice input signal processing means, and outputting a chord processing circuitry signal; and a clock generation section for providing a clock signal to the chord data decoder and the chord processing circuitry so that the chord data decoder may decode the chord control data signal and the chord processing circuitry may produce the chord according to a reference timing.

6. A playback system for a video-song medium having chord data recorded thereon as claimed in claim 1, wherein the output pre-processing means includes:

a switching section for switching at a high speed the second buffer signal and the chord processing circuitry signal respectively provided by the second buffer constituting the voice input signal processing means and the chord processing circuitry constituting the chord generation means, and outputting a switching section signal;

a third low-pass filter for low-pass filtering the switching section signal provided by the switching section in order to increase the signal-to-noise ratio of the switching section signal, and outputting a third low filter signal; and an audio amplifier for amplifying the third low filter signal provided by the third low-pass filter in order to increase the signal level of the third low filter signal, and outputting an audio amplifier signal to the audio output section means.

7. A playback system for a video-song medium having chord dada recorded thereon as claimed in claim 5, wherein the chord data decoder includes:

a sub-code interface for converting sub-code data which is serial data and provided by digital signal processing section, into a sub-code interface signal which is a parallel signal in order to output a sub-code interface signal;

a buffer ram for buffering the sub-code interface signal and for outputting a buffer ram signal;

an error correction device for correcting an error of the sub-code interface signal to generate the buffer ram signal, the error correction device being coupled to the buffer ram;

a chord processing instruction decoder for deriving and processing an instruction and data from chord data, and outputting in response to the buffer ram signal provided by buffer ram, a first chord processing instruction decoder signal and a second chord processing instruction decoder signal respectively corresponding to the data and the instruction of the chord data and outputting a third chord processing instruction decoder signal to buffer ram;

a chord control data buffer for latching the first chord processing instruction decoder signal corresponding to data latch signal in order to function to adjust a musical interval with regard to chord reproduction while being subject to control operation with inputted second chord processing instruction decoder signal thereto, and outputting a chord data decoder signal to chord processing circuitry; and a clock frequency demultiplier for frequency-demultiplying the clock signal provided by clock generation section in order to apply a frequency-demultiplied clock frequency demultiplier signal to the sub-code interface, the buffer ram, the error correction device, the chord processing instruction decoder, and the chord control data buffer.

* * * * *